C. W. STARKER.
DYNAMO ELECTRIC MACHINE.
APPLICATION FILED APR. 1, 1915.

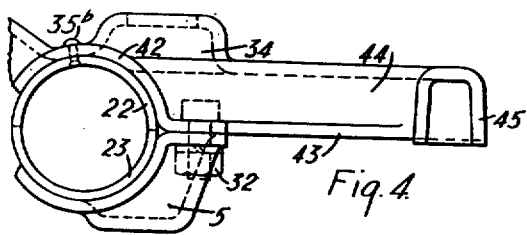
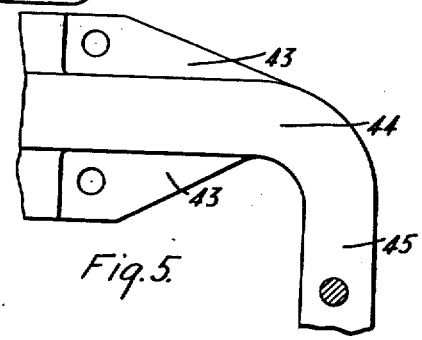
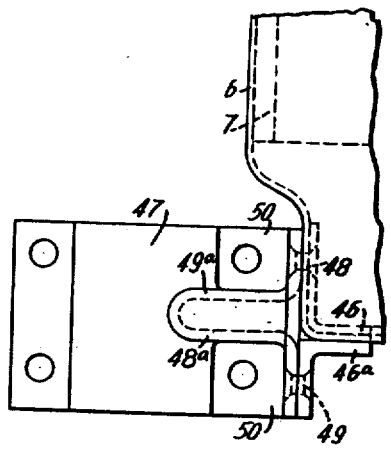
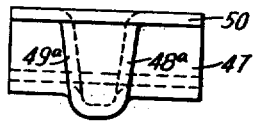
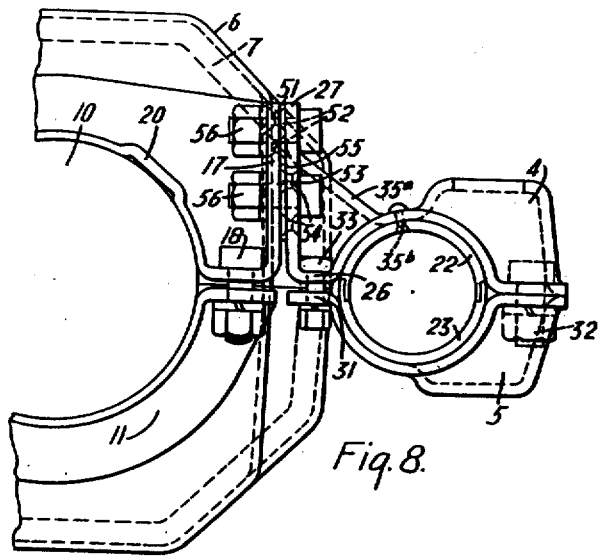

1,209,775.

Patented Dec. 26, 1916.
3 SHEETS—SHEET 3.

WITNESSES:
Fred. A. Lind
W. R. Coley

INVENTOR
Charles W. Starker
BY
[signature]
ATTORNEY

UNITED STATES PATENT OFFICE.

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,209,775. Specification of Letters Patent. Patented Dec. 26, 1916.

Application filed April 1, 1915. Serial No. 18,479.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Dynamo-Electric Machines, of which the following is a specification.

My invention relates to dynamo-electric machines, and it has special reference to structural features of frames for electric railway motors and the like.

The object of my invention is to provide a split-type motor of pressed-metal construction, whereby all the well-known and inherent advantages of such construction, including decrease of weight, size of parts, and costs of manufacture, are obtained.

In my co-pending application, Serial No. 860,974, filed September 10, 1914, is shown and described a pressed-steel railway motor frame of the box or solid-frame type.

According to my present invention, I provide a split-type pressed-metal frame having its inherent operating convenience and also embodying certain novel structural features and relations of parts.

The advantages of pressed-steel construction of dynamo-electric machine frames over the usual cast steel or iron type of frame may be summarized as follows: The weight of a machine is materially decreased by the use of pressed steel, thereby reducing the operating expense for carrying dead weight in an electric railway vehicle, for example, and lessening the cost of track maintenance. The weights and overall dimensions of equally-rated motors may be maintained constant and accurate, thereby insuring definite and exactly similar performance of all the motors, in particular, the motor speed, thus securing a uniform distribution of current to, and heating of, the motors of the same vehicle or train. From another view-point, the size of a motor for a predetermined output may be considerably decreased if pressed-steel parts are employed, thereby permitting the use of motors of larger capacities in the crowded space beneath the vehicle floors or a reduction in the floor height, as well as in the size and weight of the wheels.

Figure 1:
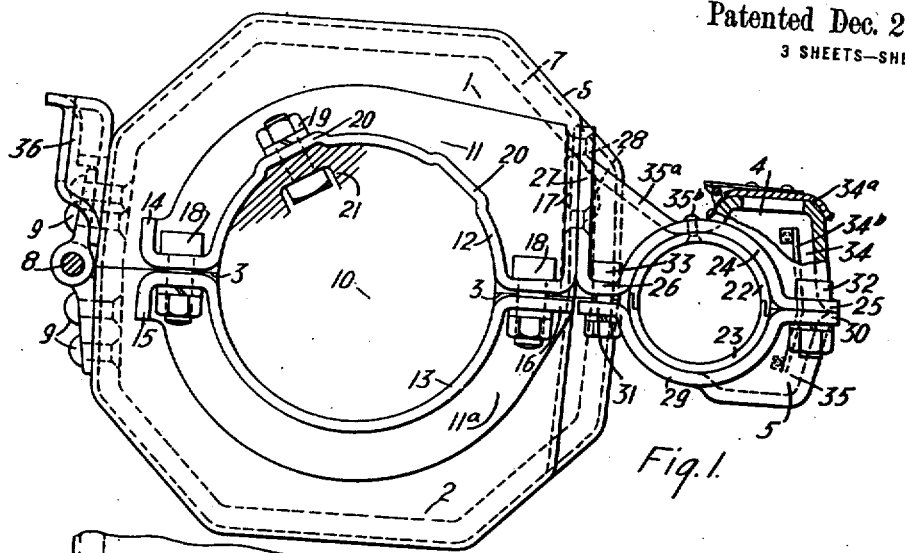
Figure 2:
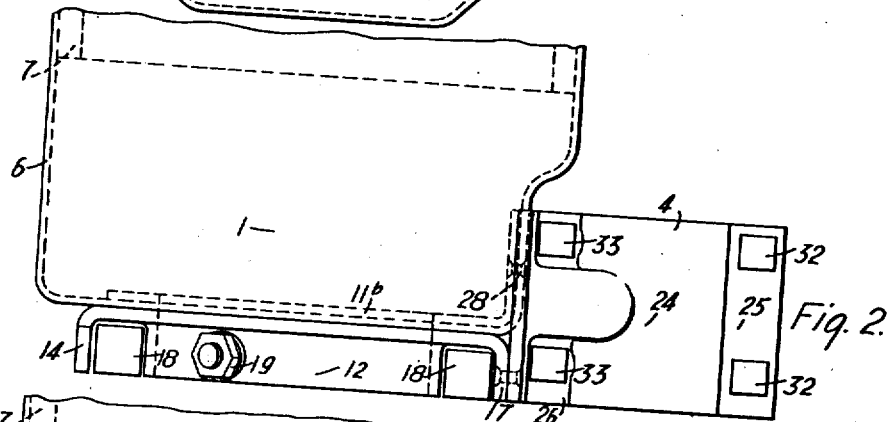
Figure 3:
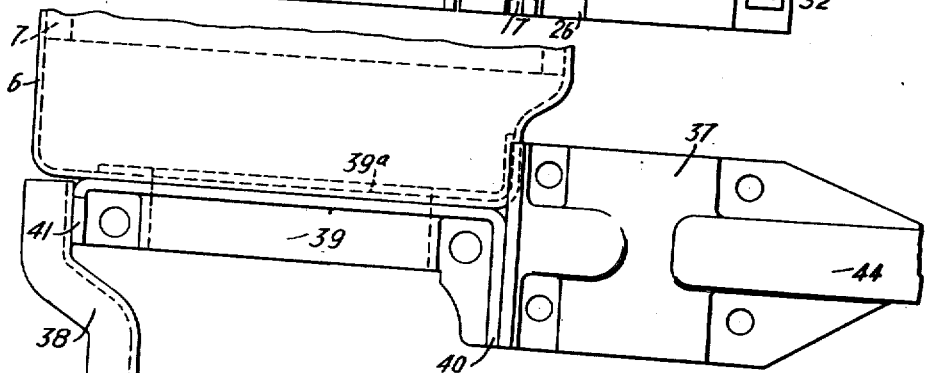
Figure 9:
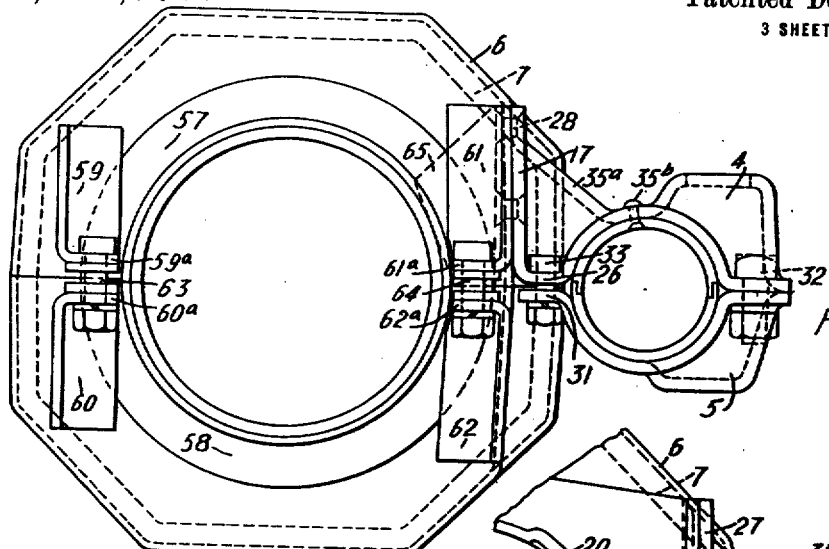
Figure 10:
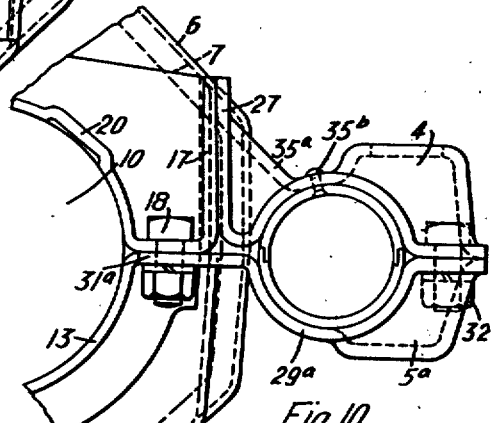
Figure 11:
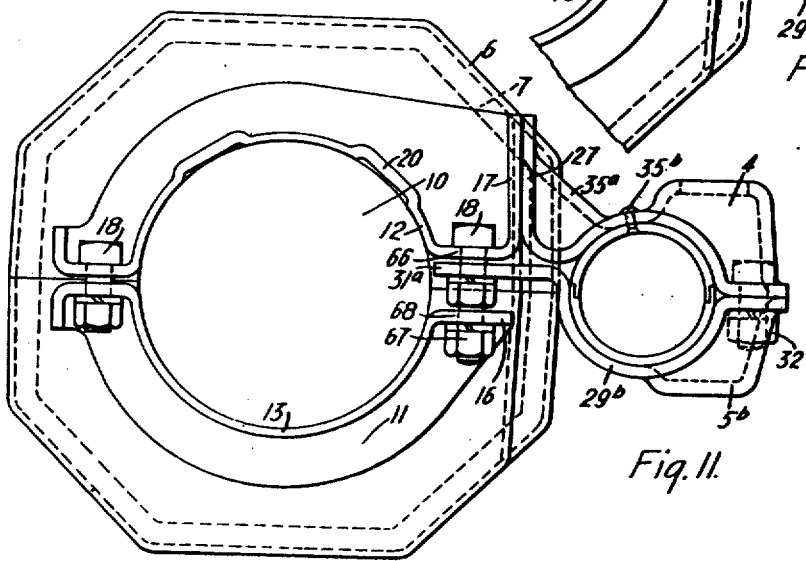

In the accompanying drawings, Figure 1 is a view in end elevation, of a motor frame constructed in accordance with my invention; Figs. 2 and 3 are fragmentary plan views of the respective ends of the structure illustrated in Fig. 1; Figs. 4 and 5 are fragmentary views, in end elevation and in plan, respectively, of a portion of the structure illustrated in Fig. 3; Fig. 6 is a plan view of a modified form of axle bracket that is adapted to be employed in my invention; Fig. 7 is a view, in side elevation, of the axle bracket shown in Fig. 6; Figs. 8 and 10 are views, in end elevation, with portions broken away, of modified forms of my invention; and Figs. 9 and 11 are similar views, in end elevation, of other modifications of the structure shown in Fig. 1.

Referring to Figs. 1 and 2 of the drawing, the structure here shown comprises upper and lower complementary incasing members 1 and 2, respectively, that meet along a substantially central plane 3, and a pair of axle-inclosing members comprising an axle bracket 4 and a coöperating axle cap 5.

The main incasing members severally comprise a split-type outer supporting or shell member 6, preferably of light pressed-steel construction, and a magnetizable yoke or band 7 that is disposed within the shell members 6 and is also split along the central plane 3. The purpose of the magnetizable band 7 is to constitute a portion of the main magnetic circuit of the motor, whereby the shell member 6 may be of relatively small cross-section that is sufficient for purposes of mechanical strength only, although the shell member will also preferably be included in the magnetic circuit. The main incasing members 1 and 2 are preferably pivotally associated with each other by means of one or more suitable hinge members 8 that may be secured to the respective incasing members through the agency of a plurality of rivets 9 or the like.

The incasing members 1 and 2 are provided with complementary central end openings 10, in accordance with customary practice, and a pair of annular bands 11 and 11$^a$, respectively having longitudinally-extending lips 12 and 13, are disposed around the openings outside the frame for the purpose of reinforcement. Preferably, suitable reinforcing rings 11$^b$ are disposed within the casing member 1 around the openings 10, and the bands 11$^a$ and 11$^b$ may be secured to the incasing members and to the reinforcing rings in any suitable manner, as by bolts, rivets or spot welding. The semicircular lip members 12 and 13 respectively terminate near one side of the frame in upwardly and downwardly extending end portions 14 and 15 that are adapted to form bolt-receiving pockets. Near the other side of the frame, the lip 13 terminates in an outwardly extending end member 16, while the lip 12 terminates in a relatively long upwardly extending end member 17. The main incasing members 1 and 2 are detachably secured together by means of a plurality of bolts 18 that are respectively disposed in the pockets formed between the semi-cylindrical lip members 12 and 13 and the various end portions just recited.

A plurality of bolts 19 extend through seats 20 of the lips 12 for the purpose of securing suitable bearing-housings to the main incasing member 1. Inasmuch as the particular type of bearing housing employed is not essential to my present invention, I have simply conventionally indicated such a housing at 21 and no further illustration is deemed necessary.

The axle-inclosing members 4 and 5 are respectively provided with inner bearing members 22 and 23, in accordance with familiar practice. The supporting portion of the axle bracket 4 for the bearing member 22 comprises a substantially semi-cylindrical portion or barrel 24 that embraces the member 22 and is provided, near its outer side, with a straight portion 25, while its inner side is continued by a straight portion 26 and an upwardly-extending end portion 27 that is disposed in contact with the upwardly-extending end 17 of the lip 12. In the particular form illustrated, the upwardly projecting ends 17 and 27 are secured together by means of a plurality of rivets 28, although other forms of attachment may be employed, some of which are set forth later. Similarly, the supporting part of the axle cap 5 for the bearing member 23 comprises a substantially semi-cylindrical portion or barrel 29 that embraces the bearing member 23 and terminates, on its outer side, in a straight portion 30 that alines with the straight portion 25 of the axle bracket, while the inner end of the barrel 29 constitutes a straight portion 31 that is disposed in substantial alinement with the straight portion 26 of the axle bracket. The axle cap 5 is detachably secured to the axle bracket 4 by means of one or more bolts 32 that extend through the straight portions 25 and 30 on one side of the respective axle-inclosing members, and by means of one or more bolts 33 that extend through the straight portions 26 and 31 of these members on the other side.

The axle-inclosing members 4 and 5 are preferably respectively provided with suitable boxes or chambers 34 and 35 for the reception of the lubricating material to be used in connection with the bearing members 22 and 23, as is customary practice. The upper chamber 34 is provided with a top opening having a suitable cover member 34ᵃ, and a longitudinally-extending suitably-split partition member 34ᵇ is preferably employed for the familiar purpose of providing an oil-gaging well and a contiguous receptacle for waste or other suitable distributer of lubricating material. The upper portion of the axle cap 4 embodies a suitable plate member 35ᵃ that may be secured to the upwardly extending end member 17 by one or more of the rivets 28, and the bearing-member 22 may be secured to the plate members 35ᵃ and the barrel 29 through the agency of one or more rivets 35ᵇ, or the like for the purpose of preventing an undesirable spread of lubricant. As a means for supporting the motor frame, on the side remote from the axle-inclosing members, a suspension bar 36 of any suitable and familiar form may be employed, and is shown as secured to the upper incasing member 1.

It will be observed that the axle bracket 4 is secured, by means of the rivets 28, partially to the incasing member 1 and the reinforcing ring 11ᵇ and partially to the upwardly-extending end 17 of the lip 12. Although the axle cap 5 is here shown as detachably secured to the axle bracket 4, obviously, the cap may be secured to the incasing member 2 in the same manner as the bracket is attached to the member 1.

Reference may now be had to Figs. 3, 4, and 5 which illustrate the pinion end of the motor frame. A combined axle bracket and gear-case-supporting arm 37 is adapted to be secured to the incasing member 1 in a manner similar to that in which the axle bracket 4 is attached, while a gear-case-supporting nose 38 is disposed on the opposite side of the end opening 10. The main incasing members, in this instance, are provided with annular bands, similar to the bands 11 and 11ᵃ, surrounding the corresponding end opening, the upper band being provided with a longitudinally-extending lip 39 which may be secured to an internally disposed reinforcing ring 39ᵃ in any suitable manner. The lip 39 is provided, near one side of the frame, with an upwardly-extending end member 40, and, near the other side of the frame, with another upwardly-extending member 41, these two end members respectively corresponding to the members 17 and 14 in the structure illustrated in Fig. 1.

The combined axle bracket and gear-case-supporting arm 37 may be secured to the upwardly-extending end 40 of the lip 39 and to the incasing member 1 in a manner similar to that in which the axle bracket 4 is attached, and the gear-case-supporting nose 38 may be positioned by spot-welding or by means of suitable rivets or bolts (not shown) that extend through the nose and the upwardly-extending end 41 of the lip 39. It should be observed that the gear-case-supporting nose may take a different form, such, for example, as being formed integrally with the upwardly-extending end 41.

A second axle cap 5 is adapted to be secured to the member 37 in a manner similar to that illustrated in Fig. 1, and the bearing members 22 and 23 are adapted to assume positions similar to those illustrated in that figure. The semi-cylindrical supporting barrel 24 of the axle bracket is here replaced by a similar curved member 42 that is provided with an extension 43 that gradually tapers into the main body-portion 44 of the gear-case-supporting arm. The body portion 44 is formed integrally with the axle portion of the member 37 and its free end 45 is bent at substantially right angles to the body portion 44 to conform to the customarily employed type of supporting arm. The end portion 45 is shown as being of channel section for purposes of lightness of weight and simplicity of manufacture.

Referring now to Figs. 6 and 7, the incasing member 1 is shown as provided with an internally-disposed reinforcing ring 46 around the corresponding end-opening and an angle member 46ᵃ that is disposed on the outside of the frame and that corresponds to the annular band 11 of Fig. 1. An axle bracket 47 is partially secured to the incasing member 1 and the reinforcing ring 46 by means of one or more rivets 48 and another portion of the axle bracket is secured to the angle member 46ᵃ through the agency of rivets 49.

For the purpose of strengthening the structure of the axle bracket 47, it is provided with a pair of transversely extending ribs or web members 48ᵃ and 49ᵃ that extend from the surface of the axle bracket adjacent to the split between the axle bracket and the axle cap to the outer curved surface of the bracket, thereby forming a plurality of bolt-receiving pockets 50 that are disposed adjacent to the incasing member 1.

The structure illustrated in Fig. 8 differs from that shown in Fig. 1 by reason of the addition of a machined plate 51 which is secured to the upper portion of the lip end member 17 by means of a plurality of rivets 52, and of a similar plate 53 that is secured to the lower portion of the bracket end member 27 by a plurality of rivets 54. The two plates 51 and 53 are of substantially equal dimensions and are adapted to engage each other along the plane 55 intermediate the ends of the members 17 and 27, which may be detachably secured together through the agency of a plurality of bolts 56. By reason of the interlocking feature of the plates 51 and 53, the bolts 56 are thus relieved of any transverse strains that may be imposed by reason of the motor frame resting upon the customary axle that extends through the independent sets of axle-inclosing members 4 and 5. The detachability of the motor frame proper and of the axle-inclosing members, as a unit, from each other permits of the novel procedure of removing the one independently of the other, if desired, for purposes of inspection and repair.

In Fig. 9, the incasing members 1 and 2 are respectively shown as provided with annular bands 57 and 58 that surround the central end opening and a plurality of angle members 59, 60, 61 and 62 that are disposed in alined pairs on the incasing members near the opposite sides thereof. The angle members are respectively provided with longitudinally extending lip members 59ᵃ, 60ᵃ, 61ᵃ and 62ᵃ through the first two of which a suitable bolt 63 extends and through the latter two a similar bolt extends, thereby detachably securing the incasing members 1 and 2 together. The axle-inclosing members 4 and 5 are shown as secured to the angle member 61 in a manner similar to the attachment thereof to the upwardly-extending end 17 of the lip 12 in the structure of Fig. 1. A suitable internally-disposed reinforcing plate 65 for use in attaching the axle bracket 4 to the incasing member 1, is preferably employed.

Fig. 10 illustrates a modification in which the semi-cylindrical supporting member 29ᵃ of an axle bracket 5ᵃ has its inner side provided with an inwardly-extending straight portion 31ᵃ that is adapted to constitute a continuation of the lip 13 of the annular band 11ᵃ. One or more bolts 18 are adapted to extend through the straight portion 31ᵃ and the corresponding portion of the lip 12 that is located near the upwardly extending end 17. The axle bracket 4 may be secured to the end member 17 in a manner similar to that illustrated in Fig. 1.

Referring to Fig. 11, the structure illustrated comprises a modified form 5ᵇ of axle cap, the outer end of which is adapted to be secured to the axle bracket 4 by means of one or more of the bolts 32 and the semi-cylindrical supporting portion 29ᵇ of which has its inner end terminating in the straight portion 31ᵃ. The lip member 12 of the annular band 11 is provided with a straight portion 66 that is disposed a relatively great distance above the central line of split 3, and the straight portion 31ᵃ of the axle cap 5ᵇ is also located above this line. One of the bolts 18 is adapted to extend through the straight portions 66 and 31ª to clamp the axle cap 5ᵇ to the incasing member 1, and a second bolt 67 is disposed behind the bolt 18 and is adapted to extend through the straight portion 66 and a corresponding straight portion 68 of the lip 13 for the purpose of securing the incasing members 1 and 2 together.

In the structure illustrated in Figs. 10 and 11, as well as some of the other structures, the bolt 32 which serves to attach the axle cap to the axle bracket may be disposed near the diagonally opposite corner from the bolt 18, thereby dispensing with a bolt 32 on the front side of the axle-inclosing members, such as is shown in Fig. 2.

For the sake of simplicity and convenience in illustrating the motor frames, Figs. 8 to 11, inclusive, are illustrated without the hinge member 8, the cover member 34ª, the partition member 34ᵇ, and suspension bar 36. It will be understood however, that these members are preferably provided in all cases.

Various modifications in the structural details herein set forth may be effected without departing from the spirit and scope of my invention and I desire, therefore, that only such limitations shall be imposed as are indicated in the appended claims.

I claim as my invention:

1. A pressed-metal dynamo-electric machine frame of the split type comprising a plurality of complementary main incasing members, a plurality of coöperating axle-inclosing members and means for securing the various pressed-metal frame parts together.

2. A pressed-steel dynamo-electric machine frame of the split type comprising an upper and a lower main incasing member, axle-inclosing members comprising an axle bracket and a coöperating axle cap, means for securing the axle-inclosing members together, means for securing at least one of said members to the corresponding main incasing member and means for securing said incasing members together.

3. A frame for dynamo-electric machines of the split type comprising a peripherally disposed split magnetizable band, a pair of complementary pressed-steel members therefor, axle-inclosing members comprising an axle bracket and a coöperating axle cap, means for removably securing the axle-enclosing members together, means for non-integrally securing at least one of said last members to the corresponding incasing member, and means for detachably securing said incasing members together.

4. A frame for dynamo-electric machines of the split type embodying a plurality of main incasing members having complementary end openings, split reinforcing bands having extending lips surrounding said openings and means associated with said lips for detachably securing said members together.

5. A frame for dynamo-electric machines of the split type comprising a pair of main incasing members having complementary end openings, split reinforcing bands surrounding said openings and having longitudinally-extending lips, a pair of axle-inclosing members, means for securing said last members together, means extending through said lips for detachably holding said main incasing members together and means for non-integrally securing at least one of said axle-inclosing members to one of said lips.

6. A frame for dynamo-electric machines of the split type comprising an upper and a lower main incasing member having complementary end openings, split reinforcing bands surrounding said openings and having longitudinally-extending lips, the lips on said upper member respectively having upwardly-extending ends located near one side of the frame, axle-inclosing members comprising an axle bracket and a corresponding axle cap, means for detachably securing said bracket and cap together, means extending through said lips for detachably holding said main incasing members together, and means for non-integrally securing said axle bracket to one of said upwardly-extending ends.

7. A frame for dynamo-electric machines of the split type comprising an upper and a lower pressed-steel main incasing member having complementary end openings, split reinforcing bands surrounding said openings, and having longitudinally-extending lips, the lips on said upper member respectively having upwardly-extending ends located near one side of the frame, axle-inclosing members comprising an upper axle bracket and a lower axle cap, a plurality of bolts for detachably securing said cap to said bracket, a plurality of bolts extending through said lips on the respective sides of each of said openings for detachably holding said main incasing members together, and a plurality of rivets for securing said axle bracket to one of said upwardly-extending ends.

8. A frame for dynamo-electric machines of the split type comprising an upper and a lower pressed-steel main incasing member having complementary end openings, split reinforcing bands surrounding said openings and having longitudinally-extending lips, the lips on said upper member respectively having upwardly-extending ends located near one side of the frame, axle-inclosing members comprising an upper axle bracket and a lower axle cap, a plurality of bolts for detachably securing said cap to said bracket, a plurality of bolts extending through said lips on the respective sides of each of said openings for detachably holding said main incasing members together, a plurality of bolts for detachably securing said axle bracket to the first of said upwardly-extending ends and interlocking means interposed between the bracket and said first end for relieving said last bolts of transverse thrust.

9. The combination with an incasing frame for dynamo-electric machines, of axle-inclosing means detachably secured thereto, whereby either said frame or said means may be removed independently the one of the other.

10. The combination with a split incasing frame for dynamo-electric machines, of axle-inclosing means comprising an axle bracket and an axle cap, and means for detachably securing said axle-inclosing means to said frame, whereby either said frame or said axle-inclosing means may be removed independently the one of the other.

11. The combination with an incasing frame for dynamo-electric machines, of independent axle-inclosing means respectively detachably secured near the ends of the frame, whereby either said frame or either of said means may be removed independently the one of the other.

12. The combination with a split incasing frame for dynamo-electric machines, of independent sets comprising axle brackets and axle caps, said sets being respectively detachably secured near the ends of the frame, whereby any of said brackets and caps may be removed independently of the frame and of each other.

13. A frame for dynamo-electric machines of the split type embodying a plurality of main incasing members having complementary end openings, split reinforcing bands surrounding said openings, a plurality of plates having extending lips and disposed on the respective incasing members on opposite sides of said openings and means for detachably securing the corresponding lips together in pairs.

14. A frame for dynamo-electric machines of the split type embodying a plurality of main incasing members having complementary end openings, split reinforcing bands having longitudinally-extending lips surrounding said openings, the first of the lips on said upper member having an upwardly-extending end located near one side of the frame, an axle bracket having one portion secured to said upwardly-extending end, and an axle cap having its sides detachably secured to the corresponding side of said axle bracket and to said first lip near said upwardly-extending end, respectively.

15. A frame for dynamo-electric machines of the split type embodying a plurality of main incasing members having complementary end openings, split reinforcing bands having longitudinally-extending lips surrounding said openings, the first of the lips on said upper member having an upwardly-extending end located near one side of the frame, an axle bracket having one portion secured to said upwardly-extending end, an axle cap having one side forming a continuation of the corresponding lip on said lower incasing member, and attaching means for said axle cap comprising a bolt extending through said axle cap side and said first lip and another bolt located diagonally opposite from the first bolt and adapted to secure the axle bracket and the axle cap together.

16. A frame for dynamo-electric machines of the split type embodying a plurality of main incasing members having complementary end openings, split reinforcing bands having longitudinally-extending lips surrounding said openings, the first of the lips on said upper member having an upwardly-extending end located near one side of the frame, an axle bracket having one portion secured to said upwardly-extending end, an axle cap having two diagonally opposite corners respectively detachably secured to said first lip and to said axle bracket, and a plurality of bolts located at the respective sides of said openings and extending through the corresponding lips for detachably securing said main incasing members together.

17. The combination with a dynamo-electric machine frame having end openings, of reinforcing bands surrounding said openings and having extending lips, and an axle-bracket secured to said frame and to said lips.

18. A frame for dynamo-electric machines of the split type comprising an upper and a lower main incasing member having complementary end openings, split reinforcing bands having longitudinally-extending lips surrounding said openings, one of the lips having an upwardly-extending end located near one side of the frame, axle-inclosing members comprising an axle bracket and an axle cap, means for detachably securing said cap to said bracket and means for nonintegrally securing said bracket to said upwardly-extending end and to said upper incasing member.

19. The combination with a dynamo-electric machine frame having end openings, of reinforcing bands surrounding said openings and having longitudinally-extending lips, and a combined axle bracket and gear-case-supporting arm associated partially with said frame and partially with said lips.

20. A frame for dynamo-electric machines of the split type comprising a pair of main incasing members having complementary end openings, split reinforcing bands having longitudinally-extending lips surrounding said openings, one of the lips having an upwardly-extending end located near one side of the frame, a combined axle bracket and gear-case-supporting arm, a coöperating axle cap, means for detachably securing said cap to said bracket and arm and means for non-integrally securing said bracket and arm to said upwardly-extending end and to the corresponding incasing member.

21. A frame for dynamo-electric machines of the split type comprising an upper and a lower pressed-steel incasing member having complementary end openings, split reinforcing rings surrounding said openings within the frame, split reinforcing bands surrounding said openings externally and having longitudinally-extending lips, one of the upper member lips having an upwardly-extending end located near one side of the frame, a combined axle bracket and gear-case-supporting arm, a coöperating axle cap, means for detachably securing said cap to said bracket and arm and means for non-integrally securing the bracket and arm to said upwardly-extending end and to said upper incasing member and the corresponding reinforcing ring.

22. The combination with a dynamo-electric machine frame having end openings, of reinforcing bands surrounding said openings and a gear-case-supporting nose associated with one of said bands.

23. The combination with a dynamo-electric machine frame of the split type embodying a pair of main incasing members having complementary end openings, of split reinforcing bands having longitudinally-extending lips, and a gear-case-supporting nose mechanically secured to one of said lips.

24. A frame for dynamo-electric machines of the split type comprising an upper and a lower main incasing member having complementary end openings, split reinforcing bands surrounding said openings and having longitudinally-extending lips, each lip on said upper member having an upwardly-extending end near one side of the frame, an axle bracket non-integrally secured to one of said upwardly extending ends and to said upper member, a combined axle bracket and gear-case-supporting arm similarly secured to the other of said ends and to the upper member, a pair of axle caps respectively detachably secured to said bracket and to said bracket and arm and a gear-case-supporting nose secured to one of said lips substantially opposite to said bracket and arm.

25. A pressed-steel dynamo-electric machine of the split type comprising a plurality of complementary main incasing members and axle-inclosing means split in alinement with the main members.

26. A pressed-steel dynamo-electric machine of the split type comprising a plurality of complementary main incasing members and a plurality of coöperating axle-inclosing members split in alinement with the main members, and means for securing the various pressed-steel frame parts together.

In testimony whereof, I have hereunto subscribed my name this 30th day of March, 1915.

CHARLES W. STARKER.